United States Patent [19]

Tamai et al.

[11] Patent Number: 4,466,828
[45] Date of Patent: Aug. 21, 1984

[54] PROCESS FOR SMELTING NICKEL

[75] Inventors: Yasukatsu Tamai; Taijiro Okabe; Akira Tomita, all of Sendai, Japan

[73] Assignee: Toyo Engineering Corporation, Tokyo, Japan

[21] Appl. No.: 551,499

[22] Filed: Nov. 14, 1983

Related U.S. Application Data

[63] Continuation of Ser. No. 391,792, Jun. 23, 1982, abandoned.

[30] Foreign Application Priority Data

Jun. 26, 1981 [JP]  Japan .................................. 56-99239

[51] Int. Cl.$^3$ ............................................. C22B 23/00
[52] U.S. Cl. ......................................... 75/82; 75/103; 75/119; 48/202; 48/210
[58] Field of Search .................. 75/24, 82, 103, 119; 48/202, 210

[56] References Cited

U.S. PATENT DOCUMENTS 1,815,888  7/1931  Baily ........................................ 75/24
4,005,995  2/1977  Tamai et al. ........................... 48/202

FOREIGN PATENT DOCUMENTS 160586  1/1964  U.S.S.R. ................................ 75/24

Primary Examiner—M. J. Andrews
Attorney, Agent, or Firm—Flynn, Thiel, Boutell & Tanis

[57] ABSTRACT

The present invention concerns a process for smelting nickel which comprises treating nickel-containing material with a reducing gas to reduce the nickel component contained in the nickel-containing material and thereby produce metallic nickel; soaking the thus-obtained material in an ammoniacal aqueous ammonium salt solution and treating it with oxygen or an oxygen-containing gas in the presence of free ammonia in order to produce an aqueous nickel ammine salt solution; treating coal with the thus-produced aqueous nickel ammine salt solution so that the coal becomes impregnated with the nickel ammine salt; separating and recovering ammonia from the thus-treated coal; gasifying catalytically the coal containing the nickel compound in the presence of a gasifying agent, thereby producing a reducing gas and a solid residue; employing part of the thus-produced reducing gas for the treatment of the nickel-containing material; and separating and recovering metallic nickel from the solid residue.

10 Claims, 3 Drawing Figures

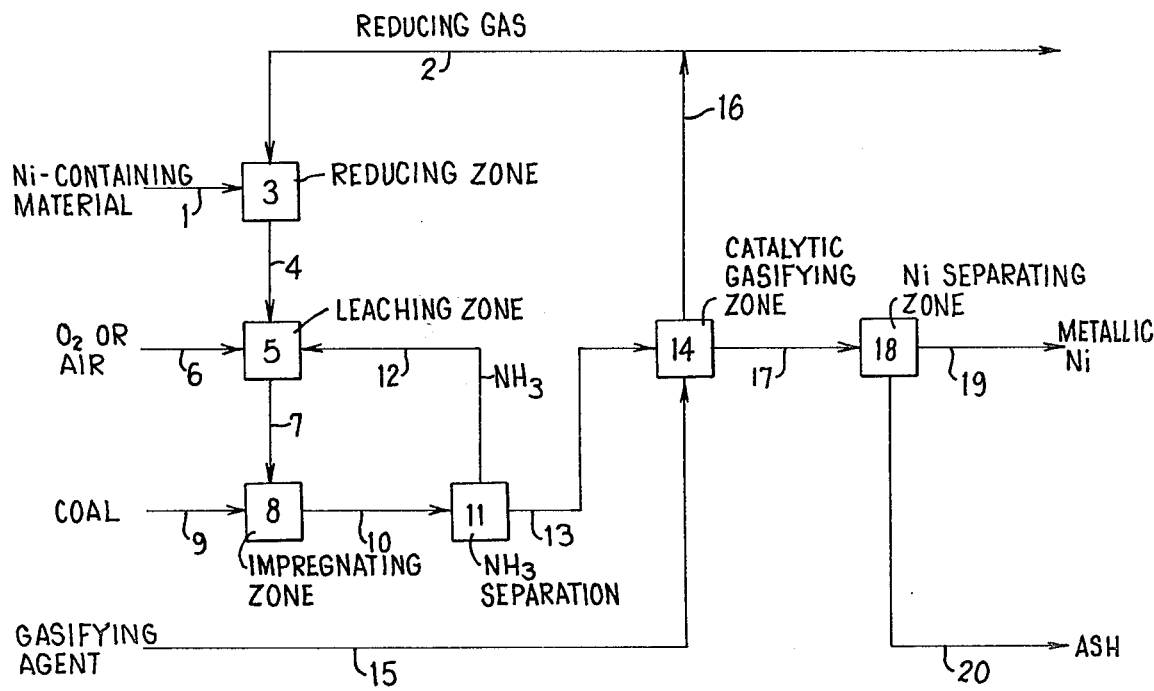
FIG. 1
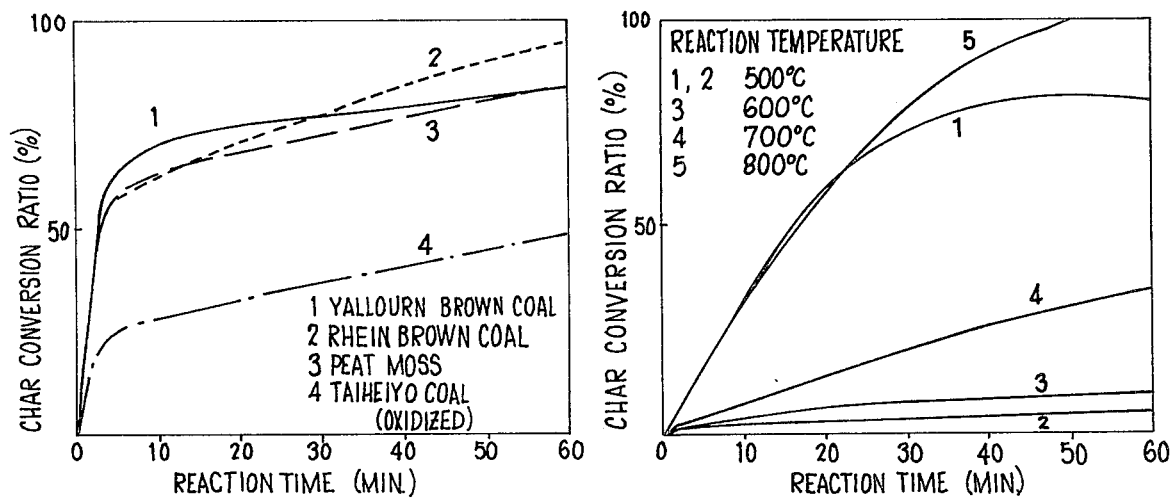
FIG. 3
FIG. 2

PROCESS FOR SMELTING NICKEL

This application is a continuation of U.S. Ser. No. 391,792, filed June 23, 1982, now abandoned.

This invention relates to a process for refining nickel. More particularly, this invention relates to a process in which a nickel refining process and a coal gasifying process are combined. The present invention provides a composite process in which metallic nickel is recovered from a nickel-containing material, such as nickel oxide ore, and simultaneously a gaseous mixture is produced that is rich with hydrogen, carbon monoxide and methane.

A variety of wet nickel refining processes are known that utilize nickel oxide-containing ore as the starting material.

For instance, a refining process is known that comprises the steps of treating nickel ore with a reducing gas to produce a reduced ore, immersing the reduced ore in an aqueous ammonium carbonate solution and treating it with oxygen or air in the presence of free ammonia to dissolve the metallic nickel of the reduced ore in the aqueous ammonium carbonate solution, whereby an aqueous nickel carbonate ammine solution is produced, heating the aqueous nickel carbonate ammine solution to remove the ammonia, whereby basic nickel carbonate is precipitated, separating and recovering the thus-precipitated basic nickel carbonate, heating the basic nickel carbonate to convert it to pure nickel oxide, and reducing the pure nickel oxide to obtain metallic nickel.

Another conventional wet nickel refining process comprises the steps of treating nickel ore with sulfuric acid to produce an aqueous nickel sulfate solution, introducing hydrogen sulfide into the aqueous nickel sulfate solution in order to convert the nickel sulfate to nickel sulfide, immersing the nickel sulfide in aqueous ammonia and treating it with oxygen or air in the presence of free ammonia to produce an aqueous nickel sulfate ammine solution, and reducing the aqueous nickel sulfate ammine solution with hydrogen under pressure to obtain powdery metallic nickel.

Both of these wet refining processes, however, have drawbacks. The first process mentioned above entails a high production cost, because heavy oil is employed in the reduction step, and, moreover, it required complicated steps for concentrating the aqueous ammine carbonate solution by heating it and for cooling the aqueous ammine carbonate solution. The second process mentioned above is rather complicated because it involves a large number of steps, and, moreover, the second process requires a disadvantageous step involving the use of high pressure hydrogen. Another disadvantageous feature of both of these processes resides in their use of a reducing gas in the recovery of the desired product, metallic nickel.

As the reducing gas in a nickel refining process, a gas produced by gasification of coal can be utilized. Japanese Patent Publication No. 54(1979)-17686 and Japanese Patent Provisional Publication No. 55(1980)-123692 propose a process for the production of metallic nickel which comprises direct reduction of nickel ore by the use of a reducing gas produced by the gasification of coal. However, the only advantage of this process is that is uses coal, which is an abundantly available resource, in place of a petroleum material, such as heavy oil. The conventional gasification process of coal is based on a high temperature reaction carried out at a temperature in the range of 800° to 2000° C. Accordingly, the above-mentioned process comprising the simple replacement of the petroleum material with coal is economically disadvantageous because of the large amount of energy required for coal gasification.

The present invention provides an improved process free from the defective features of the conventional processes. The present invention is a nickel refining process of superior efficiency having the following advantageous features. First, low grade coals, such as abundantly available brown coal and lignite, can be utilized as the source materials for producing the reducing gas. Second, the gasification can be carried out at a low temperature, and this feature is very advantageous from an economic viewpoint. Third, the steps involved in the process are simple, and metallic nickel of the desired final product can be easily recovered. Fourth, a gaseous mixture that is rich with valuable hydrogen, carbon monoxide and methane can be produced simultaneously with the metallic nickel.

Accordingly, the present invention provides a process for refining nickel which comprises: treating nickel-containing material with a reducing gas to reduce the nickel component contained in the nickel-containing material and thereby produce metallic nickel. The thus-treated material is then soaked with an aqueous ammonium salt solution and treated with oxygen or an oxygen-containing gas, in the presence of free ammonia, to produce an aqueous nickel ammine salt solution. Coal is then treated with the thus-produced aqueous nickel ammine salt solution and ammonia is separated and recovered from the treated coal. Next, the coal containing the nickel compound is catalytically gasified in the presence of a gasifying agent to convert it to a reducing gas and a solid residue. Part of the thus-produced reducing gas is employed for the treatment of the nickel-containing material in the first step of the process. Metallic nickel is separated and recovered from the solid residue.

BRIEF DESCRIPTION OF THE DRAWINGS

FIG. 1 is a schematic diagram illustrating the process of the invention.

FIGS. 2 and 3 are graphs showing the relationships of the char conversion ratios against the reaction times as described in the following Examples 1 and 2.

The process of the invention will be described below with reference to the drawings.

A nickel-containing material, such as nickel ore, is crushed to particles as small as possible and then is introduced into a reducing zone 3 through a feed path 1 together with a reducing gas supplied through a feed path 2. Nickel oxide contained in the nickel ore is reduced within the reducing zone 3. The nickel ore whose nickel oxide has been converted to metallic nickel is then introduced into a leaching zone 5 through a flow path 4. In the leaching zone 5, the nickel ore is immersed in an ammoniacal aqueous ammonium salt solution and the metallic nickel in the nickel ore is dissolved in the liquid phase, forming a nickel ammine salt, in contact with oxygen or air supplied through a path 6, in the presence of free ammonia.

The thus-produced aqueous nickel ammine salt solution is then introduced into an impregnating zone 8 through a flow path 7, and is contacted therein with coal supplied through a path 9, thereby impregnating the coal with the nickel ammine salt. The effluent from the impregnating area 8 is then introduced into an ammonia separating zone 11 through a flow path 10. Ammonia separated from the coal in the ammonia separating zone 11 is returned to the leaching zone 5 through a flow path 12.

The coal impregnated with the nickel ammine salt is introduced into a catalytic gasifying zone 14 through a path 13. Within the zone 14, the coal reacts with a gasifying agent supplied through a flow path 15 at a relatively low temperature, that is, a temperature higher than 450° C. and lower than the melting point of the ash contained in the coal employed, whereby to produce a gaseous mixture containing hydrogen, carbon monoxide and methane. The nickel ammine salt impregnated in the coal is thereby converted to metallic nickel, which is recovered as part of the solid residue together with the ash contained in the coal.

Part of the gaseous mixture containing hydrogen, carbon monoxide and methane produced in the zone 14 is introduced into the reducing zone 3 through the flow path 2. The remaining part of the gaseous mixture is taken out through a flow path 16 as a material for use in various chemical processes or as an energy source.

The solid residue from zone 14 is introduced into a nickel separating zone 18 through a path 17 in order to separate the metallic nickel from the ash. The metallic nickel, the desired final product, is then recovered through a path 19. The ash is discharged through a path 20.

The nickel-containing material to be treated in the process of the invention is a material containing a nickel compound, such as a nickel-containing ore or a residual material produced after removal of other valuable components from an ore.

The reduction of the nickel-containing material in the process of the invention is carried out at a temperature ranging from 400° C. to 800° C.

Examples of the ammoniacal aqueous ammonium salt solutions employed in the process of the invention for leaching the metallic nickel produced in the nickel-containing material include solutions of salts such as ammonium carbonate, ammonium chloride, ammonium nitrate, ammonium thiocyanate and others.

The procedure for the impregnation of coal in the process of the invention is preferably carried out at the lowest possible temperature at which the ammoniacal aqueous ammonium salt solution can be kept in a liquid state. The procedure for the impregnation is carried out for at least 2 minutes, and for a time period sufficient to allow adsorption equilibrium to be reached.

The catalytic gasification of coal in the process of the invention is carried out at a temperature higher than 450° C. The upper limit of the gasifying temperature is determined by the melting point of the ash contained in the coal employed. The gasifying agent used can be steam, hydrogen, carbon monoxide, oxygen or air, and these gasifying agents can be employed alone or in combination with one another. The catalytic gasifying zone is maintained at a pressure higher than atmospheric pressure and lower than 100 atm. The residence time in the catalytic gasifying zone is selected in the range of from 3 minutes to 2 hours.

The process of the present invention is further described by the following illustrative examples.

EXAMPLE 1

50 Kg of a laterite ore containing 1.4% of nickel was dried and crushed to a powder comprising particles 83% of which were smaller than 200 mesh. The powderized ore was then fired and reduced at 700° C. by the use of a reducing gas. The reduced laterite ore powder was cooled to 120° C., and then immersed in 150 l of a leaching solution. As the leaching solution an aqueous ammonium carbonate solution having an ammonia concentration at 11% was employed. Air was introduced into the mixture of the ore and the leaching solution under atmospheric pressure for 30 minutes. The introduction of the air was carried out while the mixture underwent stirring.

Nickel was thereby dissolved in the form of an ammine complex according to the reaction equation given below:

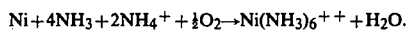

The nickel concentration in the aqueous solution separated from the residue by filtration, after completion of the leaching treatment, was 10 g/l. In 50 l of the thus-obtained aqueous solution was immersed 5 Kg of Yallourn brown coal (particle size: 0.3–0.5 mm) for 30 minutes. The brown coal recovered by filtration contained 8% by weight of nickel, calculated as metallic nickel, adsorbed thereon. The nickel-containing brown coal was gasified in an atmospheric gasification reaction apparatus using steam as the gasifying agent.

Gasification reactions were carried out at temperatures of 500° C., 600° C., 700° C. and 800° C. The relationship of the char conversion ratio against the reaction time in each of the gasification reactions is illustrated in FIG. 2, in which the total char weight is a value calculated by subtracting the weight of volatile components from the charged brown coal weight, and the char conversion is calculated by dividing the weight of gasified char by the total char weight, wherein the results are expressed in percent.

Curve 1 of FIG. 2 indicates the result of the run according to the process of the invention, and Curves 2, 3, 4 and 5 represent controls which show the relationship of char conversion to reaction time when the Yallourn brown coal having no nickel adsorbed thereon is gasified.

As is apparent from FIG. 2, gasification according to the process of the invention gave superior results at low reaction temperatures, and the char conversion reached 75% after 30 minutes, even at a gasification temperature as low as 500° C. This value is equivalent to a 90% conversion of the hydrocarbons in the coal, because the 75% conversion ratio is calculated on the weight basis of the charged brown coal (including ash) minus the volatile component. Curves 2, 3, 4 and 5, which indicate the results of non-catalytic gasification reactions wherein the coal is not impregnated with nickel, show reaction rates far lower than the reaction rate given by Curve 1 according to the process of the invention.

In the solid residue produced in the course of the gasification reaction according to the process of the invention, metallic nickel, carbon and ash were present in the ratio by weight of 1:1:0.1. Thus, 400 g of metallic nickel was easily separated and recovered. The gas produced by the gasification reaction had the composition given below (in volume %):

$H_2$—50.2%; $CO$—7.6%; $CO_2$—33.4%; $CH_4$—1.2%.

EXAMPLE 2

Yallourn brown coal and other coals of low carbonization grades were treated in the same manner as in Example 1, such that nickel was adsorbed on each of these coals in the amount of 8% by weight, calculated as metallic nickel. All the coals were then subjected to gasification at 650° C. As is apparent from FIG. 3, results similar to those observed for Yallourn coal were observed with Rhein brown coal and peat moss.

Curve 1 of FIG. 3 indicates the char conversion against the reaction time for Yallourn brown coal, and Curves 2, 3 and 4 indicate the same relationships for Rhein brown coal, peat moss and Taiheiyo coal (oxidized), respectively. The Rhein brown coal, peat moss and Taiheiyo coal (oxidized) used contained an amount of ash larger than the amount of the ash contained in the Yallourn brown coal. Nevertheless, equivalent amounts of metallic nickel were separated and recovered easily from the solid residues.

The principal reasons for the marked superiority of the present invention over the conventional processes appear to be as follows. First, in the course of the refining process the nickel works as a catalyst in the gasification step to lower the temperature needed to run the gasification reaction. Second, the nickel concentration achieved by means of the adsorption capacity of the coal in the refining process works to eliminate the need for a large amount of energy, such as is required in a heat-concentration process. Third, metallic nickel can be produced in the gasification reaction zone under a reducing atmosphere in an easily recoverable form, and fourth, low grade coals can be utilized to produce valuable gases.

The embodiments of the invention in which an exclusive property or privilege is claimed are defined as follows:

1. A process for refining nickel and gasifying coal, comprising:
   (a) treating nickel-containing material with a reducing agent in order to reduce nickel compounds contained in said nickel-containing material and thereby produce metallic nickel;
   (b) soaking the nickel-containing material treated in the step (a) in an ammoniacal aqueous ammonium salt solution and then treating said nickel-containing material in said ammoniacal aqueous ammonium salt solution with an oxygen-containing gas in the presence of free ammonia to produce an aqueous nickel ammine salt solution;
   (c) treating coal with said aqueous nickel ammine salt solution to impregnate said coal with said nickel ammine salt and ammonia;
   (d) removing the ammonia from said impregnated coal;
   (e) gasifying catalytically said coal in the presence of a gasifying agent, thereby producing a reducing gas and a solid residue containing metallic nickel;
   (f) recycling part of said reducing gas as the reducing agent in step (a); and
   (g) recovering metallic nickel from said solid residue.

2. A process according to claim 1, wherein said nickel-containing material contains nickel oxide and is pulverized into finely divided particles before treating same with said reducing agent.

3. A process according to claim 1, wherein said ammonia removed in step (d) is recycled by introducing said ammonia into said ammoniacal aqueous ammonium salt solution used in step (c).

4. A process according to claim 1, wherein said coal is catalytically gasified at a temperature of at least 450° C., but not as high as the melting point of the ash in said coal, and at a pressure in the range of 1 to 100 atmospheres, and said nickel-containing material is treated with said reducing agent at a temperature in the range of 400° C. to 800° C.

5. A process according to claim 1, wherein said gasifying agent is at least one gas selected from the group consisting of steam, carbon dioxide, hydrogen, oxygen and air.

6. A process according to claim 1, wherein said reducing gas is a mixture containing hydrogen, carbon monoxide and methane.

7. A process according to claim 1, wherein said ammoniacal aqueous ammonium salt solution is selected from the group consisting of aqueous salt solutions of ammonium carbonate, ammonium chloride, ammonium nitrate and ammonium thiocyanate.

8. A process according to claim 1, wherein said nickel-containing material is laterite ore.

9. A process according to claim 1, wherein said coal is brown coal.

10. A process according to claim 1, wherein said coal is selected from the group consisting of Yallourn brown coal, Rhein brown coal, peat moss and Taiheiyo oxidized coal.

* * * * *

UNITED STATES PATENT AND TRADEMARK OFFICE
CERTIFICATE OF CORRECTION

PATENT NO.   : 4 466 828
DATED        : August 21, 1984
INVENTOR(S)  : Yasukatsu Tamai et al It is certified that error appears in the above-identified patent and that said Letters Patent is hereby corrected as shown below:

In the title; change "smelting" to ---refining---.

Signed and Sealed this

Fifth Day of March 1985

[SEAL]

Attest:

DONALD J. QUIGG

Attesting Officer     Acting Commissioner of Patents and Trademarks